(12) United States Patent

Hsu et al.

(10) Patent No.: US 7,838,819 B2
(45) Date of Patent: Nov. 23, 2010

(54) APPARATUS AND METHOD OF GENERATING OPTICAL TWEEZERS WITH MOMENTUM

(75) Inventors: Long Hsu, Hsinchu (TW); Cheng-Hsien Liu, Hsinchu (TW); Sheng-Yang Tseng, Hsinchu County (TW); Chung-Cheng Chou, Taoyuan County (TW); Wai William Wang, Taoyuan County (TW); Fung-Hsu Wu, Taoyuan County (TW); Chen Peng, Taipei (TW); Ta-Yuan Lee, Taipei (TW)

(73) Assignee: Raydium Semiconductor Corporation, Hsinchu (TW)

( * ) Notice: Subject to any disclaimer, the term of this patent is extended or adjusted under 35 U.S.C. 154(b) by 414 days.

(21) Appl. No.: 12/019,316

(22) Filed: Jan. 24, 2008

(65) Prior Publication Data

US 2008/0174870 A1   Jul. 24, 2008

(30) Foreign Application Priority Data

Jan. 24, 2007   (TW)   ............................... 96102728 A

(51) Int. Cl.
H01S 1/00   (2006.01)
H01S 3/00   (2006.01)
H05H 3/02   (2006.01)

(52) U.S. Cl. ...................................................... 250/251
(58) Field of Classification Search .................. 250/251
See application file for complete search history.

(56) References Cited

U.S. PATENT DOCUMENTS

| | | | | |
|---|---|---|---|---|
| 5,939,716 A * | 8/1999 | Neal | ........................... | 250/251 |
| 6,067,859 A * | 5/2000 | Kas et al. | ..................... | 250/251 |
| 7,170,050 B2 * | 1/2007 | Turner et al. | ................. | 250/251 |
| 7,491,928 B2 * | 2/2009 | Roichman et al. | ............ | 250/251 |
| 7,599,069 B2 * | 10/2009 | Toussaint et al. | ............ | 356/491 |
| 2004/0089798 A1 * | 5/2004 | Gruber et al. | ............... | 250/251 |
| 2004/0090632 A1 * | 5/2004 | Dholakia et al. | ............ | 356/450 |
| 2004/0207922 A1 * | 10/2004 | Grier et al. | .................... | 250/251 |
| 2005/0176134 A1 * | 8/2005 | Grier et al. | ............... | 435/287.2 |
| 2006/0060767 A1 * | 3/2006 | Wang et al. | .................. | 250/251 |
| 2006/0131494 A1 * | 6/2006 | Grier et al. | .................... | 250/251 |
| 2007/0023622 A1 * | 2/2007 | Grier et al. | .................... | 250/251 |
| 2007/0084993 A1 * | 4/2007 | Grier et al. | .................... | 250/251 |
| 2007/0139784 A1 * | 6/2007 | Roichman et al. | ........... | 359/614 |
| 2009/0190221 A1 * | 7/2009 | Boer et al. | .................... | 250/221 |

* cited by examiner

Primary Examiner—Jack I Berman
Assistant Examiner—Brooke Purinton
(74) Attorney, Agent, or Firm—Rabin & Berdo, P.C.

(57) ABSTRACT

An apparatus of generating optical tweezers with momentum is provided for providing optical tweezers with a first momentum on a test piece. The apparatus comprises a laser source, a diffractive optical element (DOE) and a lens. The laser source is for outputting a laser beam. The DOE has a first phase-delay picture, and the laser beam forms a diffraction pattern after passing the first phase-delay picture. The lens is for receiving and focusing the diffraction pattern on the test piece to form the first optical tweezers with the first momentum. The lens has an optical axis intersecting the DOE at an optical intersection point, a geometric center of the phase-delay picture has a displacement vector relative to the optical intersection point and a direction of the first momentum is related to a direction of the displacement vector.

18 Claims, 7 Drawing Sheets

APPARATUS AND METHOD OF GENERATING OPTICAL TWEEZERS WITH MOMENTUM

This application claims the benefit of Taiwan application Serial No. 96102728, filed Jan. 24, 2007, the subject matter of which is incorporated herein by reference.

BACKGROUND OF THE INVENTION

1. Field of the Invention

The invention relates in general to an apparatus of generating optical tweezers, and more particularly to an apparatus of generating optical tweezers which can provide optical tweezers with momentum.

2. Description of the Related Art

The technology of "optical tweezers" for catching small particles or cells by using a gradient of a laser beam has existed. According to the conventional optical-tweezers technology, when a laser beam passes a diffractive optical element (DOE) with a phase-delay picture, the laser beam passing different parts of the phase-delay picture diffracts with each other to form a diffraction pattern which can be used to determine the gradient of the laser beam. The part of the diffraction pattern with higher light intensity has an effect of catching small particles.

However, the conventional optical-tweezers technology cannot provide the optical tweezers with transverse momentum (vertical to an optical axis) to shift the caught small particles. Therefore, the conventional optical-tweezers technology has to adjust a light modulator or use an extra push force for providing the optical tweezers with a momentum to shift the caught small particles.

SUMMARY OF THE INVENTION

The invention is directed to an apparatus and method of generating optical tweezers with momentum, which can effectively improve the drawback of the conventional optical-tweezers generating apparatus which cannot provide the optical tweezers with momentum for shifting the caught small particles and has the advantage of being capable of providing the optical tweezers with momentum.

According to a first aspect of the present invention, an apparatus of generating optical tweezers with transverse momentum is provided. The apparatus is for providing first optical tweezers with a first momentum on a test piece. The apparatus comprises a laser source, a DOE and a lens. The laser source is for outputting a laser beam. The DOE has a first phase-delay picture, and the laser beam forms a diffraction pattern after passing the first phase-delay picture. The lens is for receiving and focusing the diffraction pattern on the test piece to form the first optical tweezers with the first momentum. The lens has an optical axis intersecting the DOE at an optical intersection point, a geometric center of the phase-delay picture has a displacement vector relative to the optical intersection point and a direction of the first momentum is related to a direction of the displacement vector.

According to a second aspect of the present invention, a method of generating optical tweezers with momentum is provided. The method is applied to an apparatus of generating optical tweezers with transverse momentum for providing optical tweezers with a momentum on a test piece. The method comprises providing a DOE with a phase-delay picture; providing a laser beam passing the phase-delay picture and a lens for generating the optical tweezers on the test piece, wherein the DOE intersects an optical axis of the lens at an optical intersection point; and shifting the DOE along a first direction of a surface of the DOE such that a geometric center of the phase-delay picture has a displacement vector relative to the optical intersection point and the optical tweezers has the transverse momentum, wherein a direction of the displacement vector is related to a direction of the momentum.

According to a third aspect of the present invention, a method of generating optical tweezers with momentum is provided. The method is applied to an apparatus of generating optical tweezers with momentum for providing optical tweezers with a momentum on a test piece. The method comprises determining the momentum; providing a DOE with a phase-delay picture corresponding to the momentum; and providing a laser beam passing the phase-delay picture and a lens for generating the optical tweezers on the test piece, wherein the DOE intersects an optical axis of the lens at an optical intersection point, a geometric center of the phase-delay picture has a displacement vector relative to the optical intersection point, and a direction of the displacement vector is related to a direction of the momentum.

The invention will become apparent from the following detailed description of the preferred but non-limiting embodiments. The following description is made with reference to the accompanying drawings.

DETAILED DESCRIPTION OF THE INVENTION

Embodiment One

Figure 1:
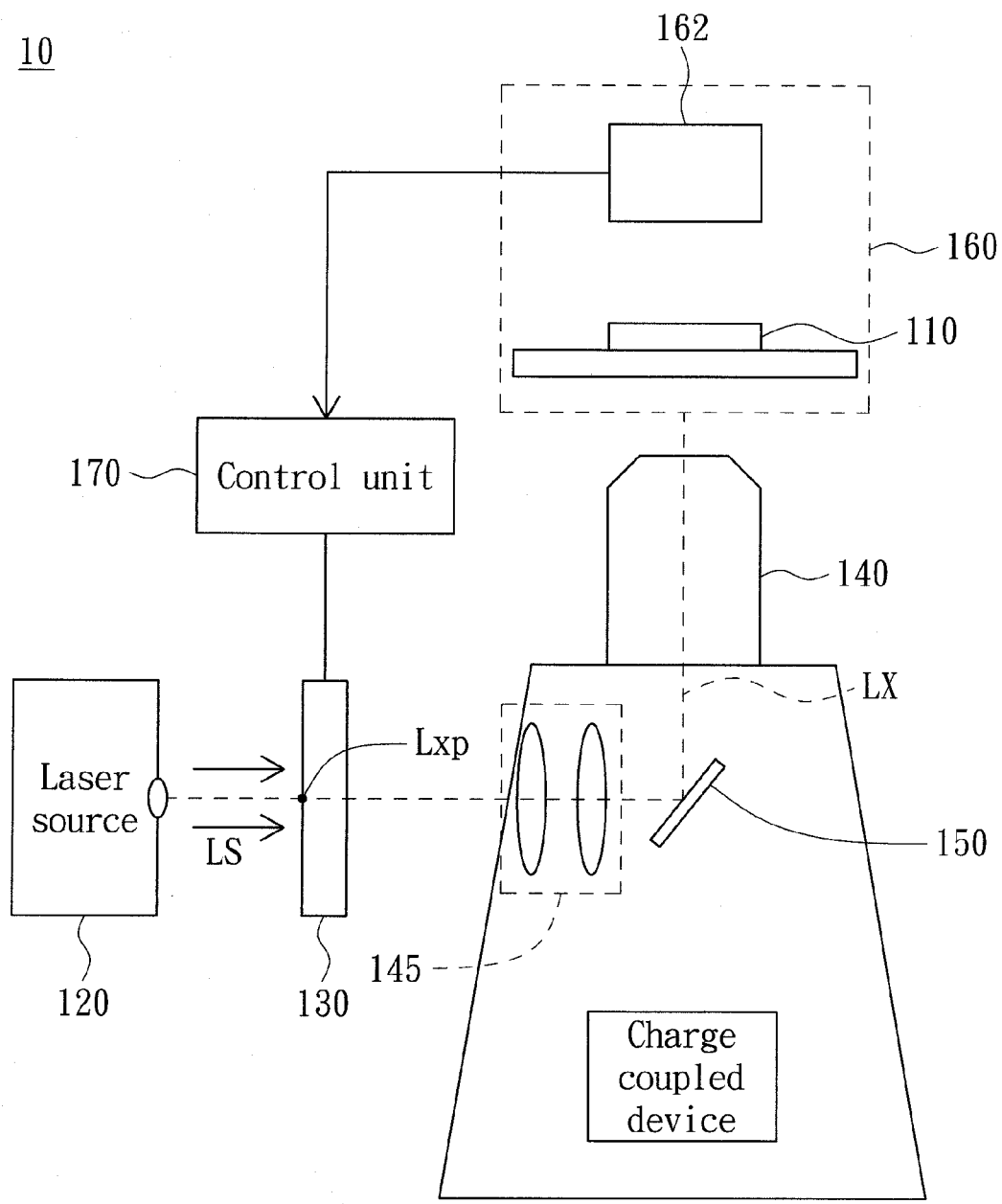
FIG. 1 is a block diagram of an apparatus of generating optical tweezers with momentum according to a first embodiment of the invention.
Figure 2:
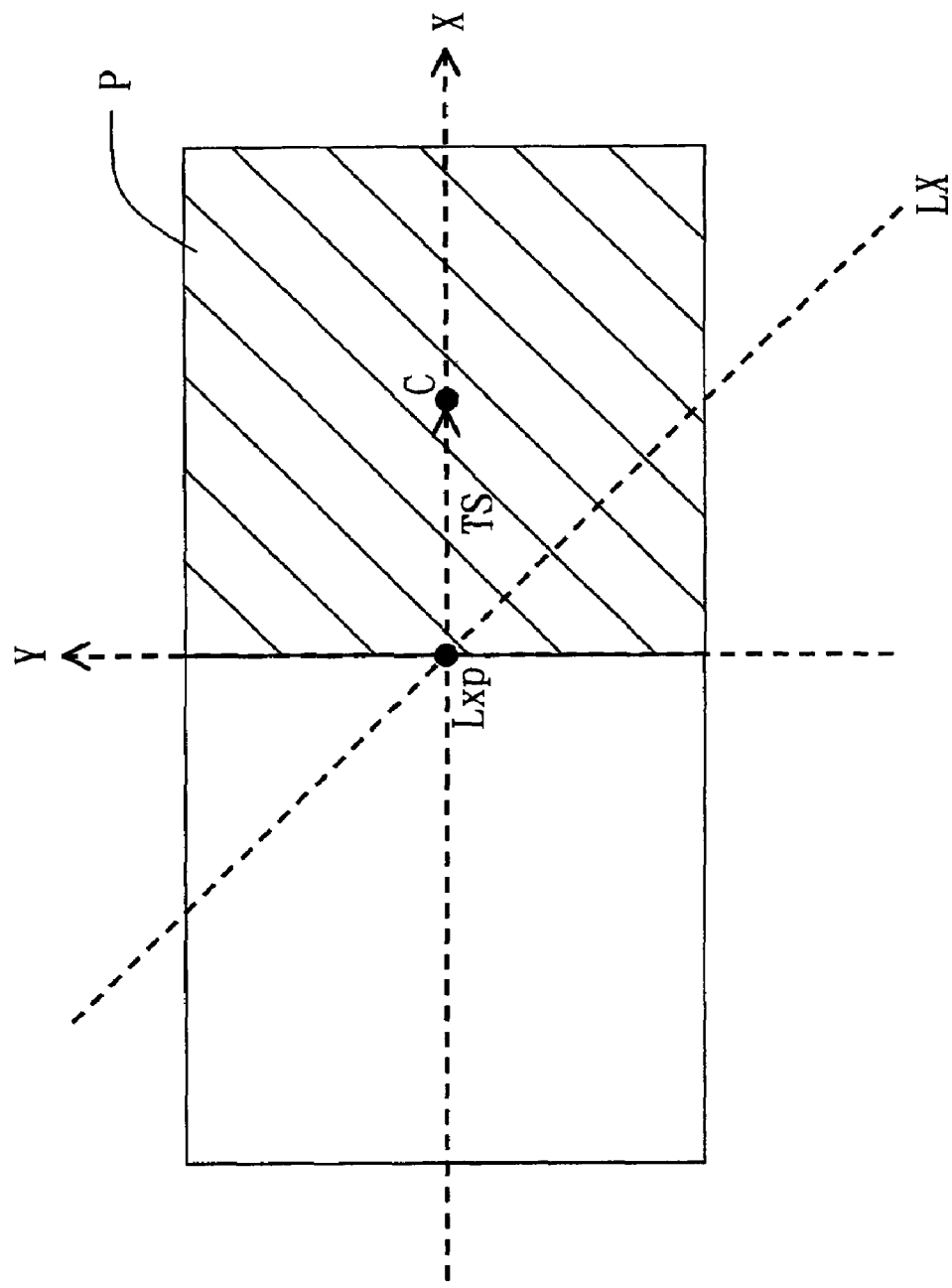
FIG. 2 illustrates the DOE 130 in FIG. 1.
Figure 3:
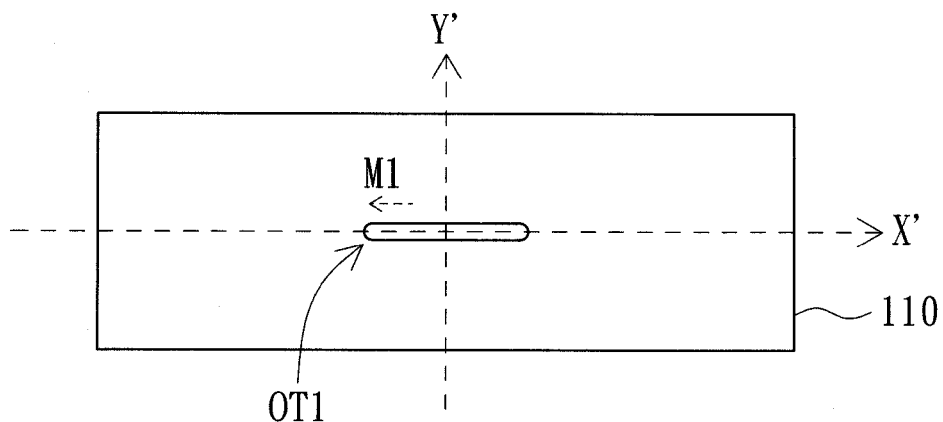
FIG. 3 is a schematic diagram of the optical tweezers OT1 sensed by the image sensor 162 of test unit 160 in FIG. 1.

Referring to FIGS. 1, 2 and 3, a block diagram of an apparatus of generating optical tweezers with momentum according to a first embodiment of the invention, a structure diagram of the DOE 130 in FIG. 1 and a schematic diagram of the optical tweezers OT1 sensed by the image sensor 162 of the test unit 160 in FIG. 1 are shown respectively. The test piece 110 has a number of small particles (not shown in the figure) for instance. An apparatus 10 for generating optical tweezers with momentum is for providing the optical tweezers OT1 with a momentum M1 on the test piece 110 to control the small particles.

The apparatus 10 for generating optical tweezers with momentum includes a laser source 120, a DOE 130, a micro-object lens 140, a mirror 150 and a test unit 160. The micro-object lens 140 has an optical axis LX, which extends through the mirror 150 to the DOE 130 and the laser source 120. A laser beam LS radiates in parallel into the DOE 130 and the laser beam LS passing the DOE 130 forms an image at a back focal plane of the micro-object lens 140 via a lens set 145 and the mirror 150. Afterward, the laser beam LS is focused via the micro-object lens 140 to form the required light-field distribution on a front focal plane of the micro-object lens 140.

The laser source 120 is for outputting the laser beam LS along the optical axis LX, and the optical axis LX intersects the DOE 130 at an optical intersection point LXP. The test unit 160 includes an image sensor 162 and the user can observe a moving situation of the small particles in the test piece 110 via the image sensor 162.

The DOE 130 has a phase-delay picture P and a geometric center C of the phase-delay picture P has a displacement vector TS relative to the optical intersection point LXP for instance. In the embodiment, the direction of the displacement vector TS is substantially equal to the direction of an x-coordinate. After the laser beam LS passes the phase-delay picture P, the laser beam LS passing different parts of the phase-delay picture P has different delayed phases, which diffracts with each other to form a diffraction pattern.

The lens 140 receives and focuses the diffraction pattern on the test piece 110 to form the optical tweezers OT1 with the momentum M1. The direction of the momentum M1 is related to the direction of the displacement vector TS. In the embodiment, the optical tweezers OT1 is a straight bright fringe and the direction of the momentum M1 is opposite to that of the displacement vector TS.

In the embodiment, each point of the phase-delay picture P is represented by a unit point (x, y) of a right-angle coordinate frame using the optical intersection point LXP as a base point and the phase delay function $\phi(x,y)$ of each point (x, y) satisfies a phase delay function of a cylindrical lens: $\phi(x,y) = (f_x^* x + f_y^* y) + l_1 [(x-x_0)^2 + (y-y_0)^2]$. In the embodiment, when each point of the phase-delay picture P has the phase delay function $\phi(x,y)$ satisfying the phase delay function of the cylindrical lens, the laser beam LS, after passing the phase-delay picture P, can form the optical tweezers OT1 with better brightness uniformity to shift the small particles more uniformly.

The values $f_x$ and $f_y$ of the above delay function $\phi(x,y)$ are constants for respectively determining a horizontal position and a vertical position of the optical tweezers OT1 on the test piece 110, generated as the laser beam LS passes the phase-delay picture P. In the embodiment, both of the values $f_x$ and $f_y$ are substantially equal to 0. When the value $f_x$ gets larger, the position of the optical tweezers OT1 moves along the +x' axis, whereas when the value $f_x$ gets smaller, the position of the optical tweezers OT1 moves along the -x' axis. The relation between the value $f_y$ and the vertical position of the optical tweezers OT1 can be obtained by analog according to the relation between the value $f_x$ and the horizontal position of the optical tweezers OT1.

The value $l_1$ of the above delay function $\phi(x,y)$ is a constant, and $x_0$ and $y_0$ are coordinates of the geometric center C relative to the x-coordinate and y-coordinate. That is, the displacement vector TS of the geometric center C relative to the optical intersection point LXP is substantially equal to $(x_0, y_0)$. In the embodiment, $y_0$ is substantially equal to 0, and thus the displacement vector TS is substantially directed to the +x axis and has a magnitude substantially equal to an absolute value of $x_0$. By doing this, the laser beam LS after passing the phase-delay picture P can form the optical tweezers OT1 having the momentum M1 directed to -x' axis.

Figure 4:
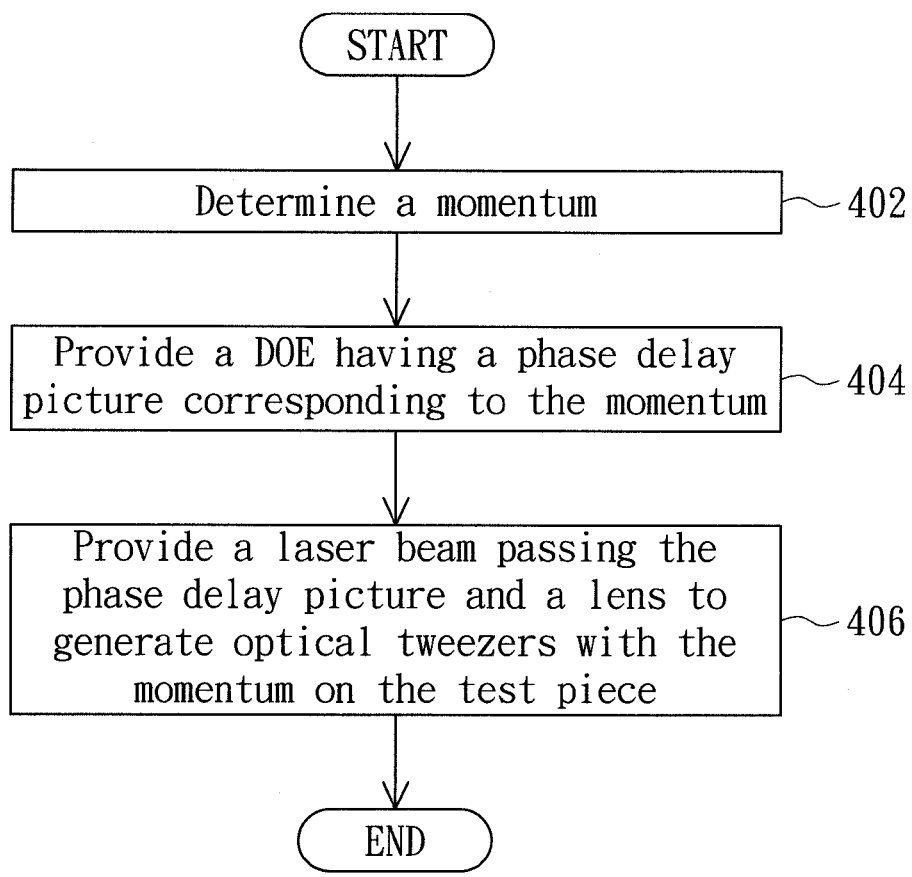
FIG. 4 is a flow chart of a method of generating optical tweezers with momentum according to the first embodiment of the invention.

Referring to FIG. 4, a flow chart of a method of generating optical tweezers with momentum according to the first embodiment of the invention is shown. First, in step 402, determine the momentum M1 of the laser optical tweezers OT1 to be generated. Following that, in step 404, provide the DOE 130 having the phase-delay picture P corresponding to the momentum M1. The geometric center C of the phase-delay picture P has the displacement vector TS relative to the optical intersection point LXP, and the direction of the displacement vector TS is related to that of the momentum M1. Next, in step 406, provide the laser beam LS passing the phase-delay picture P to generate a diffraction pattern, such as straight bright fringes. The straight bright fringes are outputted to the lens 140 via the mirror 150, and the lens 140 focuses the straight bright fringes on the test piece 110 to form the optical tweezers OT1 with the momentum M1.

Figure 5:
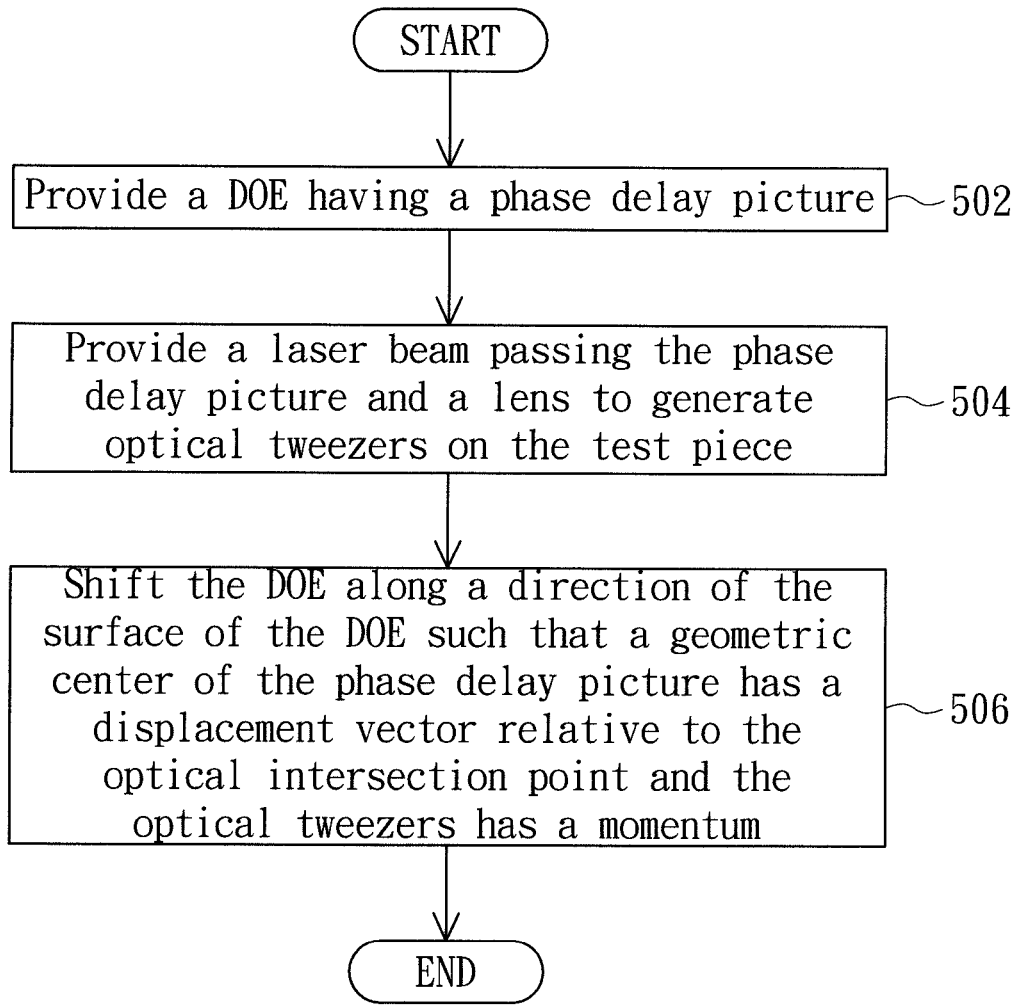
FIG. 5 is a flow chart of another method of generating optical tweezers with momentum according to the first embodiment of the invention.

The embodiment further provides another method of generating the optical tweezers with momentum, whose operational steps are shown in FIG. 5. FIG. 5 is a flow chart of another method of generating optical tweezers with momentum according to the first embodiment of the invention. First, in step 502, provide the DOE 130 having the phase-delay picture P. Following that, in step 504, provide the laser beam LS passing the phase-delay picture P to generate a diffraction pattern, such as straight bright fringes. The straight bright fringes are outputted to the lens 140 via the mirror 150, and the lens 140 focuses the straight bright fringes on the test piece 110 to form the optical tweezers OT1. The optical axis LX of the lens 140 of the embodiment extends via the mirror 150 to the DOE 130 and intersects the DOE 130 at the optical intersection point LXP. Next, in step 506, shift the DOE 130 along the +x axis of the surface of the DOE 130 such that the geometric center C of the phase-delay picture P has a displacement vector TS in a direction of the +x axis relative to the optical intersection point LXP. Thus, the optical tweezers OT1 generated has the momentum M1 with a direction of the -x' axis.

For example, the DOE 130 of the embodiment is a programmable DOE, which can adjust the phase delay of each point on the phase-delay picture P by program to correct the shape and momentum of the optical tweezers OT1. The apparatus 10 for providing optical tweezers with momentum further includes a control unit 170 coupled to the DOE 130 and the image sensor 162. The user of the apparatus 10 can correct the phase-delay picture P of the DOE 130 via the control unit 170 to form optical tweezers with different momentums and shapes on the test piece 110.

Although the apparatus 10 of generating optical tweezers with momentum is exemplified to generate the straight optical tweezers OT1 with the momentum M1 according to the phase-delay picture P for illustration, the apparatus 10 of generating optical tweezers with momentum of the embodiment is not limited to generating a single optical tweezers, but can generate two or more than two optical tweezers with the same or different momentums. The optical tweezers is also not limited to having the shape of a straight line, but can be of any other shape. Although the direction of the displacement vector TS is exemplified to be opposite to that of the momentum M1 for illustration, the direction of the displacement vector TS is not limited to being opposite to that of the momentum M1, but can be substantially the same as that of the momentum M1. The test piece 110 of the embodiment is a micro-fluid chip for instance.

In the apparatus of generating optical tweezers with momentum disclosed by the embodiment, the geometric center of the phase-delay picture of the DOE is deviated from the optical intersection point of the lens's optical axis and the DOE, and has a displacement vector relative to the optical intersection point. Therefore, the apparatus of generating optical tweezers with momentum can generate optical tweezers with momentum through the above arrangement to effectively improve the drawback of the conventional optical tweezers which cannot generate the optical tweezers with momentum.

Embodiment Two

Figure 6:
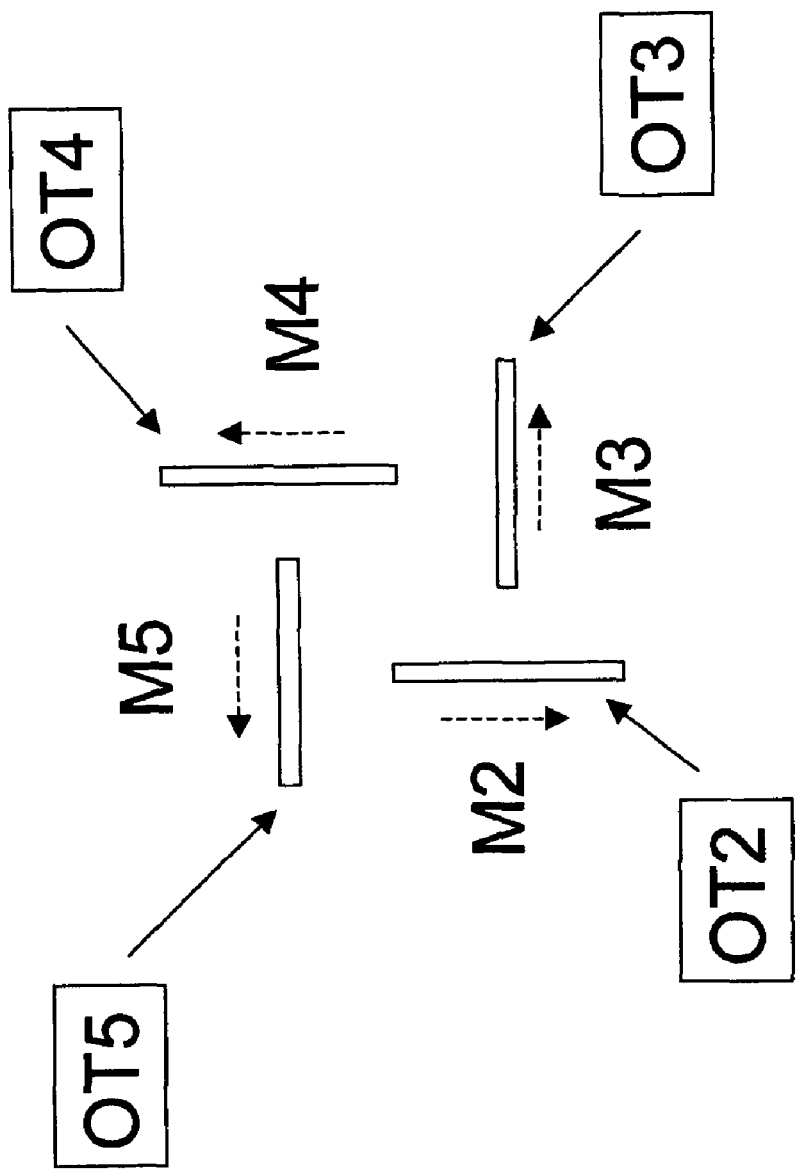
FIG. 6 is a schematic diagram of the optical tweezers OT2~Ot5 of the test piece 110 according to the second embodiment of the invention.
Figure 7:
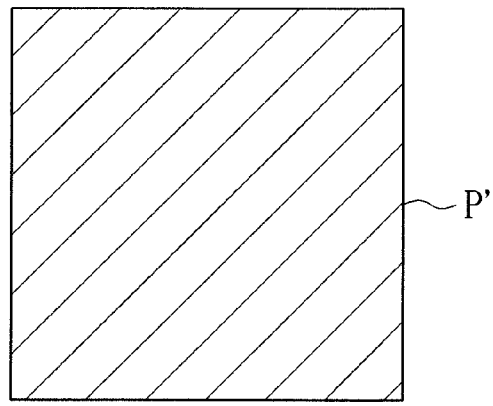
FIG. 7 is a schematic diagram of a DOE 230 according to the second embodiment of the invention.

Referring to FIGS. 6 and 7, a schematic diagram of optical tweezers OT2~OT5 of the test piece 110 according to the second embodiment of the invention and a schematic diagram of a DOE 230 according to the second embodiment of the invention are shown respectively. The difference between the apparatus 10 of generating optical tweezers with momentum of the embodiment and that of the first embodiment lies on that the DOE 230 takes place of the DOE 130. The DOE 230 has a phase-delay picture P'. After the laser beam LS passes the phase-delay picture P', four straight optical tweezers OT2~OT5 are generated on the test piece 110 with momentums M2~M5 respectively to control small particles of the test piece 110 to move annularly along the directions of the momentums M2~M5. The phase delay of each point on the phase-delay picture P' is determined by a delay function $\phi'(x, y)$.

Figure 8A:
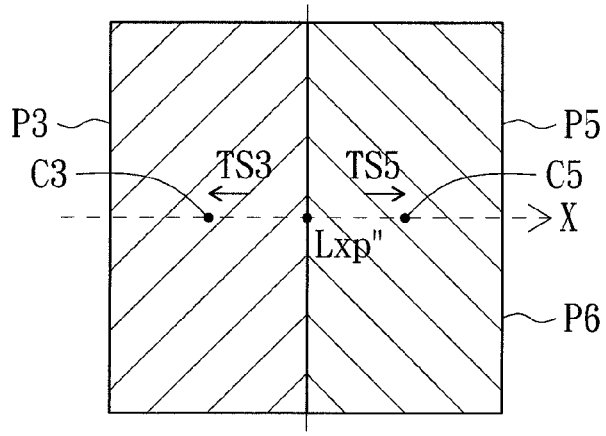
FIG. 8A is a schematic diagram of a DOE 232 according to the second embodiment of the invention.
Figure 8B:
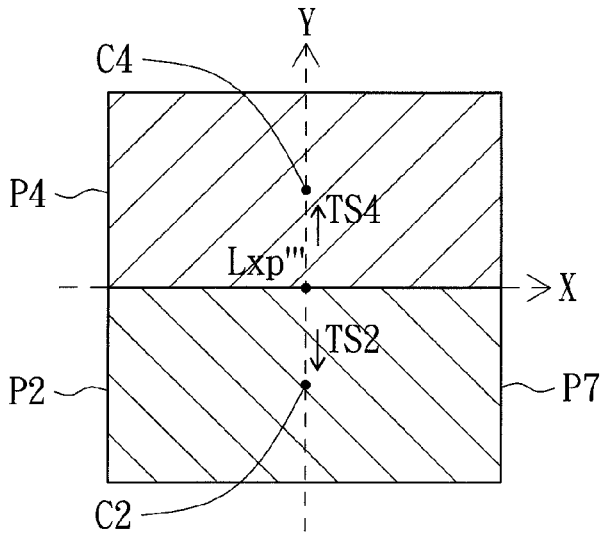
FIG. 8B is a schematic diagram of a DOE 234 according to the second embodiment of the invention.

Referring to FIGS. 8A and 8B, schematic diagrams of a DOE 232 and a DOE 234 according to the second embodiment of the invention are shown respectively. The phase-delay picture P6 of the DOE 232 includes a phase-delay picture P3 with a momentum C3 and a phase-delay picture P5 with a momentum C5, respectively located at a left-half side and a right-half side of the phase-delay picture P6. When the DOE 130 is replaced by the DOE 232, the laser beam LS passes the phase-delay pictures P3 and P5 to respectively form the optical tweezers OT3 and OT5 on the test piece 110. The phase delay of each point on the phase-delay picture P6 is determined by a phase delay function $\phi6(x,y)$.

The phase-delay picture P7 of the DOE 234 includes a phase-delay picture P2 with a momentum C2 and a phase-delay picture P4 with a momentum C4, respectively located at an upper-half side and a lower-half side of the phase-delay picture P7. When the DOE 130 is replaced by the DOE 234, the laser beam LS passes the phase-delay pictures P2 and P4 to respectively form the optical tweezers OT2 and OT4 on the test piece 110. The phase delay of each point on the phase-delay picture P7 is determined by a phase delay function $\phi7(x,y)$. The phase delay function $\phi'(x,y)$ of the phase-delay picture P' of the DOE 230 is obtained by calculation according to the phase delay functions $\phi6(x,y)$ and $\phi7(x,y)$. In the following description, the calculation of the phase delay function $\phi'(x,y)$ of the DOE 230 is illustrated.

To calculate the phase delay function $\phi'(x,y)$ for generating the optical tweezers OT2~OT5, the phase delay function $\phi6(x,y)$ is multiplied by a random mask (not shown in the figure) and the phase delay function $\phi6(x,y)$ is multiplied by another random mask (not shown in the figure). The above two random masks are complementary to each other. Following that, the products of the two phase delay functions $\phi6(x,y)$ and $\phi7(x,y)$ with the phase delay functions of the corresponding random masks are summed up and the summation is used to be the phase delay function $\phi'(x,y)$.

Figure 9:
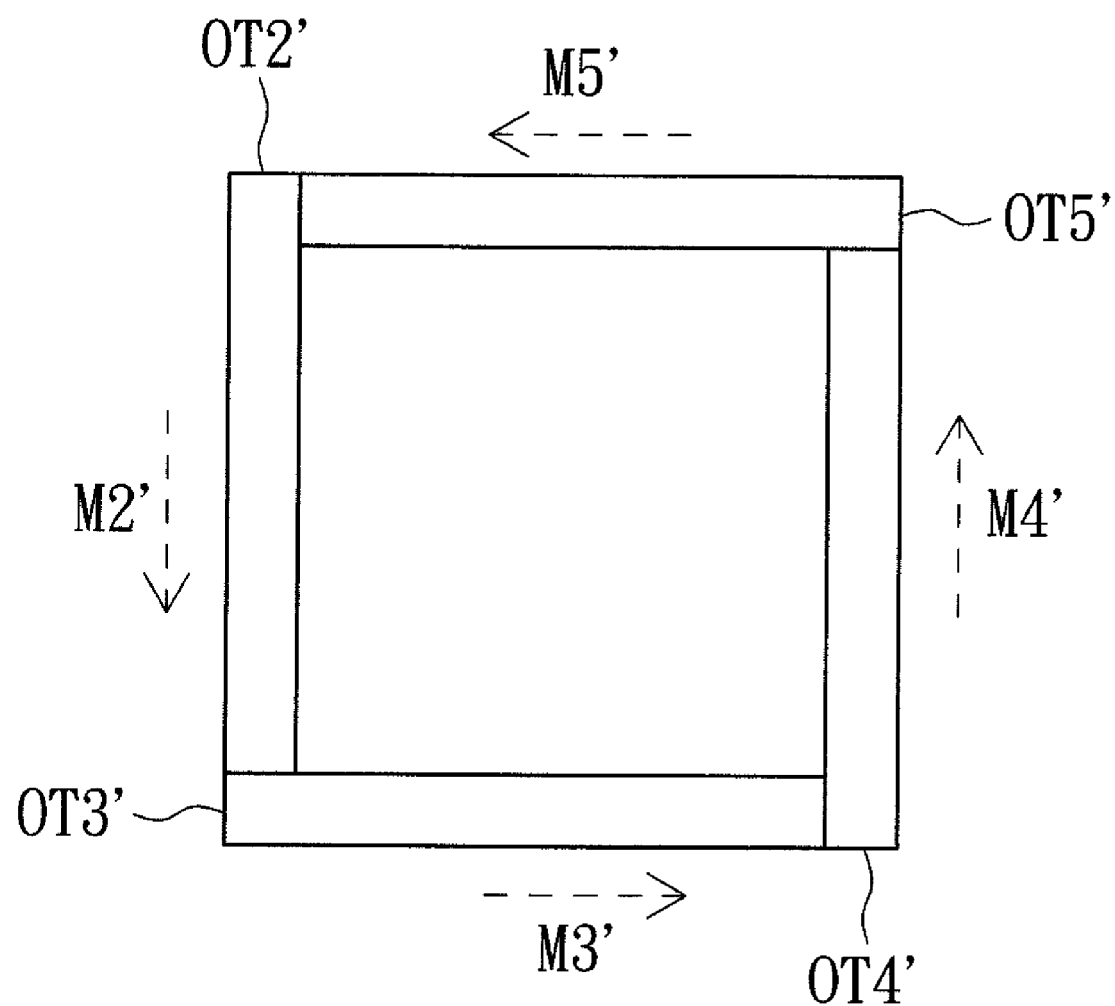
FIG. 9 is another schematic diagram of the optical tweezers OT2~OT5 of the test piece 110 according to the second embodiment of the invention.

Although the positions of the optical tweezers OT2~OT5 with momentums M2~M5 are exemplified to be designed for controlling the small particles of the test piece 110 to move annularly, the apparatus 10 for generating optical tweezers with momentum disclosed by the embodiment can have other arrangement of the positions and momentums M2~M5 of the optical tweezers OT2~OT5 to achieve the same effect. As shown in FIG. 9, optical tweezers OT2'~OT5' are arranged to form a square and have momentums M2'~M5' respectively. In this way, the small particles can also be driven to move annularly.

The apparatus of generating optical tweezers with momentum can control the small particles of the test piece to move along a path formed by momentums of several optical tweezers by a suitable design of the positions and momentums of the optical tweezers in addition to having the advantage of providing optical tweezers with momentum on the test piece.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus of generating optical tweezers with transverse momentum, for providing first optical tweezers with a first momentum on a test piece, the apparatus comprising:
   a laser source, for outputting a laser beam;
   a diffractive optical element (DOE), having a first phase-delay picture, wherein the laser beam forms a diffraction pattern after passing the first phase-delay picture;
   a lens, for receiving and focusing the diffraction pattern on the test piece to form the first optical tweezers with the first momentum;
   wherein the lens has an optical axis intersecting the DOE at an optical intersection point, a geometric center of the phase-delay picture has a displacement vector relative to the optical intersection point and a direction of the first momentum is related to a direction of the displacement vector; and
   the phase delay $\phi(x, y)$ of each point $(x, y)$ on the first phase-delay picture of the DOE satisfies: $\phi(x, y) = (f_x * x + f_y * y) + l_1[(x-x_0)^2 + (y-y_0)^2]$, where x and y are respectively the transverse coordinate and longitudinal coordinate of a right-angle coordinate frame using the optical intersection point as a base point, $l_1$, $f_x$, $f_y$ are constants, and the displacement vector formed by the geometric center of the first phase-delay picture and the optical intersection point is equal to $(x_0, y_0)$.

2. The apparatus according to claim 1, wherein the magnitude of the first momentum is related to the magnitude of the displacement vector.

3. The apparatus according to claim 1, wherein the direction of the first momentum is opposite to the direction of the displacement vector.

4. The apparatus according to claim 1, further comprising:
   a test unit, comprising an image sensor for detecting the test piece.

5. The apparatus according to claim 1, wherein the DOE is a programmable DOE.

6. The apparatus according to claim 5, further comprising a control unit coupled to the programmable DOE and the image sensor, wherein the control unit adjusts the first phase-delay picture of the programmable DOE by program such that the optical tweezers with different momentums are formed on the test piece.

7. The apparatus according to claim 1, wherein the first optical tweezers is a straight bright fringe.

8. The apparatus according to claim 1, wherein the DOE further comprises a second phase-delay picture, the laser beam passes the second phase-delay picture and the lens to form second optical tweezers with a second momentum on the test piece.

9. A method of generating optical tweezers with momentum, applied to an apparatus of generating optical tweezers with transverse momentum for providing optical tweezers with a momentum on a test piece, the method comprising:
   (a) providing a diffractive optical element (DOE) with a phase-delay picture;
   (b) providing a laser beam passing the phase-delay picture and a lens for generating the optical tweezers on the test piece, wherein the DOE intersects an optical axis of the lens at an optical intersection point; and
   (c) shifting the DOE along a first direction of a surface of the DOE such that a geometric center of the phase-delay picture has a displacement vector relative to the optical intersection point and the optical tweezers have the transverse momentum;
   wherein a direction of the displacement vector is related to a direction of the momentum; and
   the phase delay $\phi(x, y)$ of each point $(x, y)$ on the phase-delay picture of the DOE satisfies: $\phi(x, y)=(f_x{}^*x+f_y{}^*y)+l_1[(x-x_0)^2+(y-y_0)^2]$, where x and y are respectively the transverse coordinate and longitudinal coordinate of a right-angle coordinate frame using the optical intersection point as a base point, $l_1$, $f_x$, $f_y$ are constants, and the displacement vector formed by the geometric center of the phase-delay picture and the optical intersection point is equal to $(x_0, y_0)$.

10. The method according to claim 9, wherein the magnitude of the momentum is related to the magnitude of the displacement vector.

11. The method according to claim 9, wherein the direction of the momentum is opposite to the direction of the displacement vector.

12. The method according to claim 9, wherein the DOE is a programmable DOE.

13. The method according to claim 9, wherein the optical tweezers is a straight bright fringe.

14. A method of generating optical tweezers with momentum, applied to an apparatus of generating optical tweezers with momentum for providing optical tweezers with a momentum on a test piece, the method comprising:
   (a) determining the momentum;
   (b) providing a diffractive optical element (DOE) with a phase-delay picture corresponding to the momentum; and
   (c) providing a laser beam passing the phase-delay picture and a lens for generating the optical tweezers on the test piece;
   wherein the DOE intersects an optical axis of the lens at an optical intersection point, a geometric center of the phase-delay picture has a displacement vector relative to the optical intersection point, and a direction of the displacement vector is related to a direction of the momentum; and
   the phase delay $\phi(x, y)$ of each point $(x, y)$ on the phase-delay picture of the DOE satisfies: $\phi(x, y)=(f_x{}^*x+f_y{}^*y)+l_1[(x-x_0)^2+(y-y_0)^2]$, where x and y are respectively the transverse coordinate and longitudinal coordinate of a right-angle coordinate frame using the optical intersection point as a base point, $l_1$, $f_x$ and $f_y$ are constants, and the displacement vector formed by the geometric center of the phase-delay picture and the optical intersection point is equal to $(x_0, y_0)$.

15. The method according to claim 14, wherein the magnitude of the momentum is related to the magnitude of the displacement vector.

16. The method according to claim 14, wherein the direction of the momentum is opposite to the direction of the displacement vector.

17. The method according to claim 14, wherein the DOE is a programmable DOE.

18. The method according to claim 14, wherein the optical tweezers is a straight bright fringe.

* * * * *